US006782326B2

(12) United States Patent
Takamoto et al.

(10) Patent No.: US 6,782,326 B2
(45) Date of Patent: Aug. 24, 2004

(54) FLOW RATE MEASURING APPARATUS (75) Inventors: Masaki Takamoto, c/o National Research Laboratory of Metrology, National Institute of Advanced Industrial Science and Technology, Ministry of Economy, Trade and Industry, 1-4, Umezono 1-chome, Tsukuba-shi, Ibaraki (JP); Akira Yamasaki, c/o National Research Laboratory of Metrology, National Institute of Advanced Industrial Science and Technology, Ministry of Economy, Trade and Industry, 1-4, Umezono 1-chome, Tsukuba-shi, Ibaraki (JP); Kenzo Hosoi, Ibaraki (JP); Satoshi Arai, Tokyo (JP); Kazuyoshi Shimizu, Tokyo (JP)

(73) Assignees: National Institute of Advanced Industrial Science and Technology (JP); Ministry of Economy, Trade and Industry (JP); Japan Automobile Research Institute (JP); Kaijo Corporation (JP); Masaki Takamoto (JP); Akira Yamasaki (JP)

( * ) Notice: Subject to any disclaimer, the term of this patent is extended or adjusted under 35 U.S.C. 154(b) by 43 days.

(21) Appl. No.: 09/768,857

(22) Filed: Jan. 24, 2001

(65) Prior Publication Data

US 2001/0010031 A1 Jul. 26, 2001

(30) Foreign Application Priority Data

Jan. 26, 2000 (JP) .......................... 2000-016679

(51) Int. Cl.$^7$ ................................................ G01F 1/66
(52) U.S. Cl. .......................... 702/48; 702/143; 702/104; 702/100; 702/85; 73/861.27
(58) Field of Search .......................... 702/48, 54, 143; 73/861.27, 861.28

(56) References Cited

U.S. PATENT DOCUMENTS 5,557,536 A * 9/1996 Nabity et al. ................. 702/48
6,053,054 A 4/2000 Wusterbarth et al. .... 73/861.28

OTHER PUBLICATIONS

Yamasaki, A., et al. "Study on Direct Measurement of Diesel Exhaust Gas Flow Rate" Ttransactions of the Japan Society of Mechanical Engineers, Compilation B, vol. 66, No. 642, Feb. 25, 2000, pp. 619–626.

* cited by examiner

Primary Examiner—Kamini Shah
(74) Attorney, Agent, or Firm—Lerner, David, Littenberg, Krumholz & Mentlik, LLP (57) ABSTRACT

A flow rate measuring apparatus capable of accurately measuring a flow rate of fluctuating fluid. A mode setting circuit selectively sets any one of a plurality of predetermined transmission modes different in transmission timing. The mode setting circuit sets any one of a first transmission mode which permits an ultrasonic wave to be transmitted at a predetermined timing for every period of a flow waveform of exhaust gas, a second transmission mode which permits an ultrasonic wave to be transmitted at a timing shifted by a predetermined time for every period of the flow waveform of the exhaust gas and a third transmission mode which permits an ultrasonic wave to be transmitted at predetermined intervals.

12 Claims, 5 Drawing Sheets

FIG. 7

FLOW RATE MEASURING APPARATUS

BACKGROUND OF THE INVENTION

This invention relates to a flow rate measuring apparatus, and more particularly to a flow rate measuring apparatus for measuring a flow rate of fluid varying or fluctuating such as exhaust gas discharged from an internal combustion engine such as an automobile engine or the like.

There has been conventionally known an ultrasonic flowmeter or flow rate measuring apparatus adapted to measure a flow rate of fluid by means of an ultrasonic wave. Such an ultrasonic flowmeter is constructed so as to measure a flow rate of exhaust gas discharged from an automobile engine by transmission/reception of an ultrasonic wave and applied to measurement of performance of an automobile engine, environmental protection or the like. Such a conventional ultrasonic flowmeter is adapted to measure a flow rate at predetermined intervals within each of measuring sections.

Figure 6:
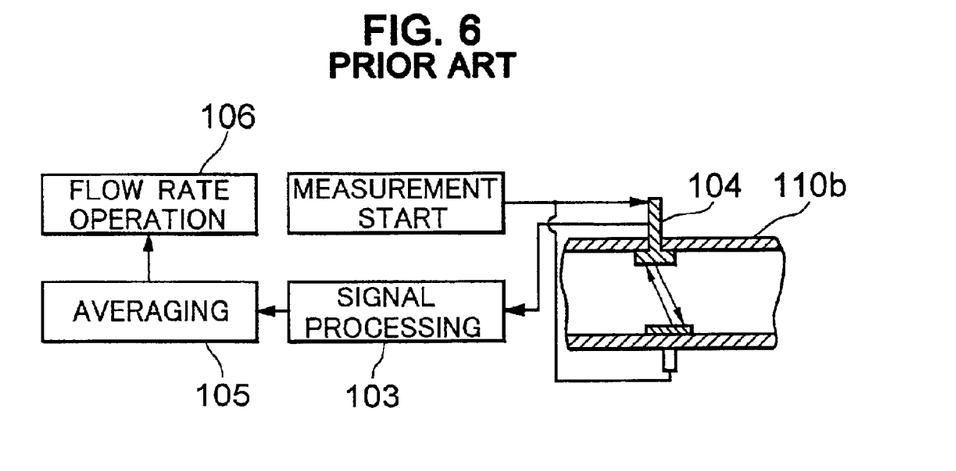
FIG. 6 is a block diagram showing a conventional flow rate measuring apparatus.
Figure 7:
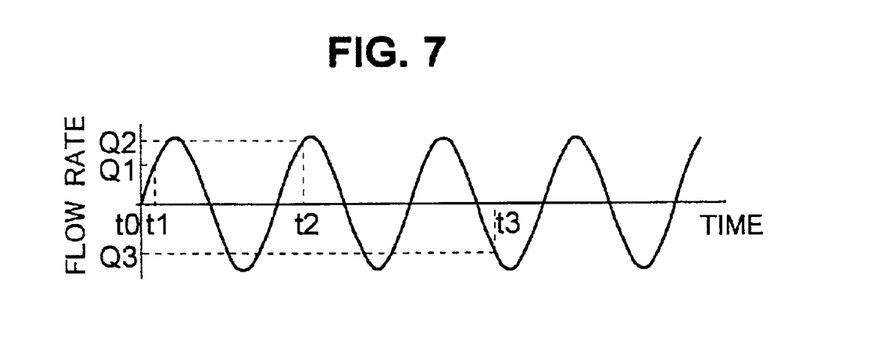
FIG. 7 is a waveform diagram showing a waveform of a flow rate during a periodic flow rate variation in the conventional flow rate measuring apparatus of FIG. 6.

Now, such a conventional ultrasonic flowmeter or flow rate measuring apparatus will be described with reference to FIGS. 6 and 7, wherein FIG. 6 is a block diagram of the flow rate measuring apparatus and FIG. 7 is a diagram showing waveforms of a flow rate during a periodic variation in flow rate in the flow rate measuring apparatus.

The conventional flowmeter, as shown in FIG. 6, includes a flow rate detection section 104 constituted by a thermal flow sensor or the like. The flow rate detection section 104 is mounted on a fluid pipe 110b and adapted to generate an output signal. The output signal of the flow rate detection section 104 is fed to a signal processing section 103, which digitizes the output signal. The signal processing section 103 has an averaging section 105 connected thereto, which is adapted to average the digitized output signal of the signal processing section 103, when any periodic variation occurs in flow of fluid in the fluid pipe 110b. The averaging section 105 has a flow rate operation section 106, which is adapted to calculate an average flow rate of the fluid using the averaged output signal. The flow rate measuring apparatus, as shown in FIG. 7, is adapted to carry out sampling of the flow rate in an intermittent manner, so that flow rates Q1, Q2 and Q3 measured at times t1, t2 and t3 may be averaged, leading to calculation of the flow rate.

However, the conventional ultrasonic flowmeter fails to accurately measure a flow rate of fluid pulsating at a relatively high frequency such as exhaust gas discharged from an internal combustion engine or the like, so that it is required to carry out measurement over a long period of time in order to calculate an average of the flow rate. Also, the conventional ultrasonic flowmeter causes a significant error to occur in measurement of an instantaneous flow rate, to thereby render measurement of a flow rate at a transient state substantially difficult or meaningless. Nevertheless, a tighter control of exhaust emission requires that an instantaneous flow rate and pulsating flow per se be measured or analyzed as well as an average of a flow rate.

Thus, it would be highly desirable to develop an ultrasonic flowmeter which is capable of measuring a typical flow rate of pulsating flow in a short period of time and reproducing pulsating flow.

SUMMARY OF THE INVENTION

The present invention has been made in view of the foregoing disadvantage of the prior art.

Accordingly, it is an object of the present invention to provide a flow rate measuring apparatus which is capable of accurately measuring a flow rate of fluid varying or fluctuating.

In accordance with the present invention, a flow rate measuring apparatus is provided. The flow rate measuring apparatus includes an ultrasonic transmission section for transmitting an ultrasonic wave to fluid flowing in a flow passage, and an ultrasonic receiving section for receiving an ultrasonic wave which has propagated through the fluid. The apparatus further includes a transmission timing control section constructed so as to permit the ultrasonic transmission section to transmit an ultrasonic wave in accordance with a plurality of transmission modes different in transmission timing from each other, and a flow rate operation section for calculating a flow rate of the fluid on the basis of an output signal of the ultrasonic receiving section.

In a preferred embodiment of the present invention, the flow rate measuring apparatus further includes a transmission mode selection section for carrying out change-over among the transmission modes based on a result of the calculation by the flow rate operation section.

In a preferred embodiment of the present invention, the transmission modes include a first transmission mode which permits an ultrasonic wave to be transmitted at a predetermined timing for every period of a flow waveform of the fluid and a second transmission mode which permits an ultrasonic wave to be transmitted at a timing shifted by a predetermined time for every period of the flow waveform of the fluid.

In a preferred embodiment of the present invention, the transmission modes further include a third transmission mode which permits an ultrasonic wave to be transmitted at predetermined intervals.

In a preferred embodiment of the present invention, the flow rate measuring apparatus further includes a transmission timing setting section for resetting a transmission timing of the first transmission mode in accordance with a result of the calculation by the flow rate operation section. The transmission mode selection section carries out change-over from the second transmission mode to the first transmission mode thus reset.

In a preferred embodiment of the present invention, the flow rate measuring apparatus further includes a flow rate variation judging section for judging whether or not a variation in flow rate is reduced based on a result of the calculation by the flow rate operation section. The transmission mode selection section carries out change-over from the first or second transmission mode to the third transmission mode when a variation in flow rate is reduced.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a flow rate measuring apparatus according to the present invention will be described with reference to FIGS. 1 to 5. The following description will be made in connection with measurement of a flow rate of exhaust gas discharged from an automobile engine.

Figure 1:
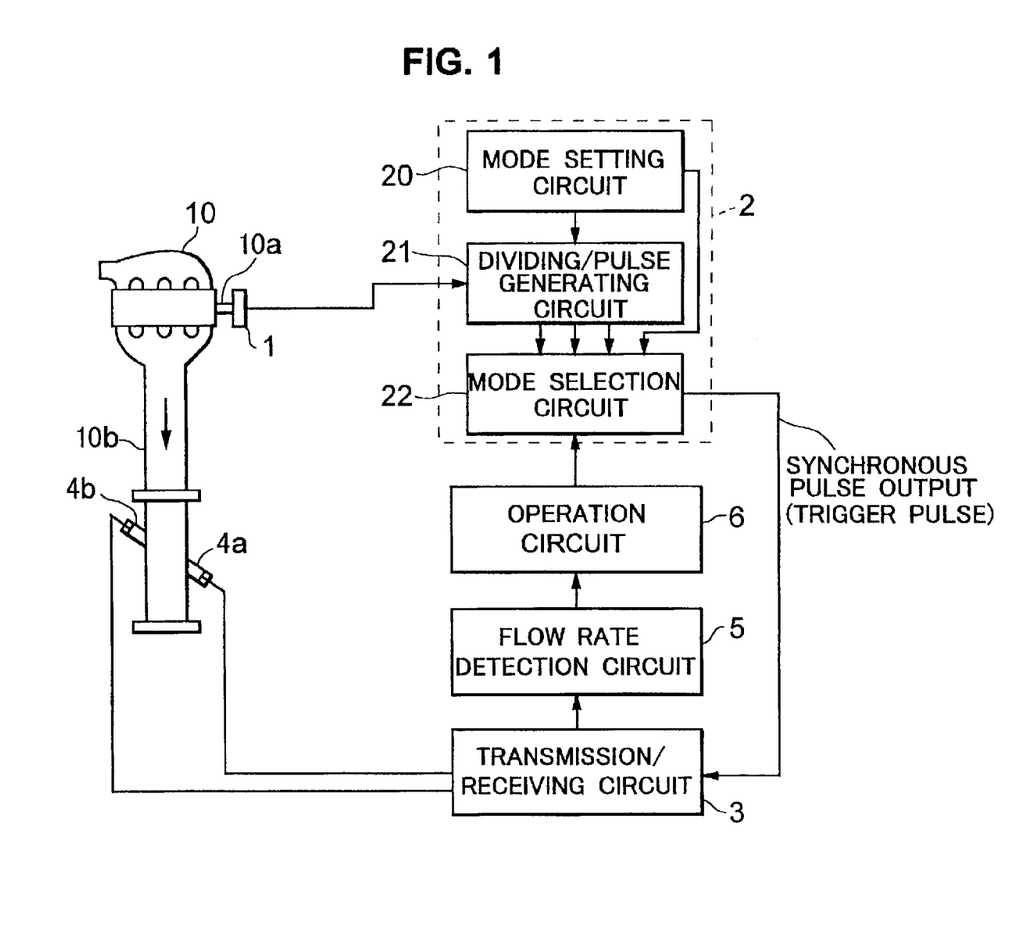
FIG. 1 is a block diagram showing an embodiment of a flow rate measuring apparatus according to the present invention.
Figure 2A:
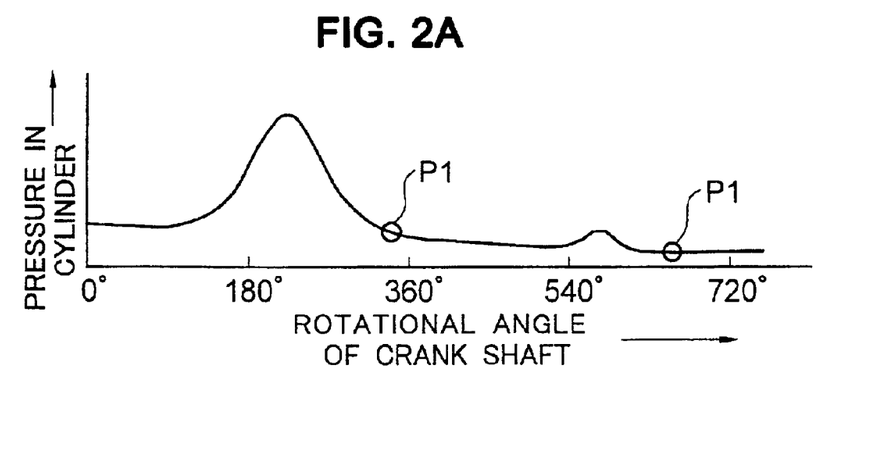
FIGS. 2A to 2C each are a waveform diagram showing a waveform due to fluctuating flow of exhaust gas.
Figure 2B:
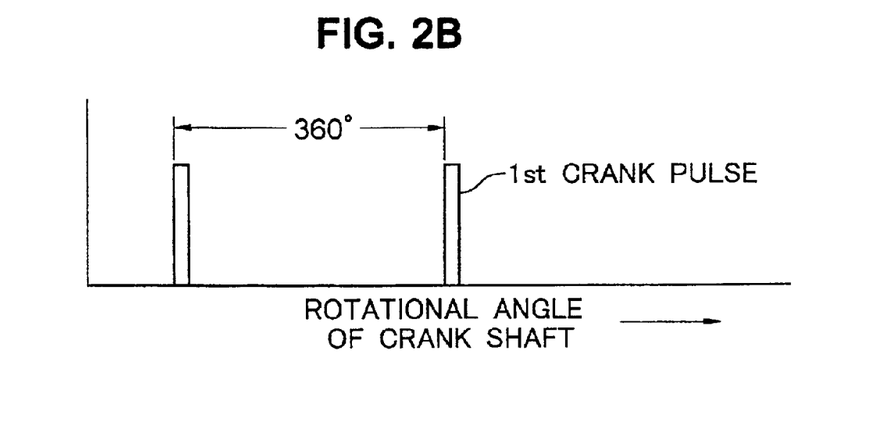
Figure 2C:
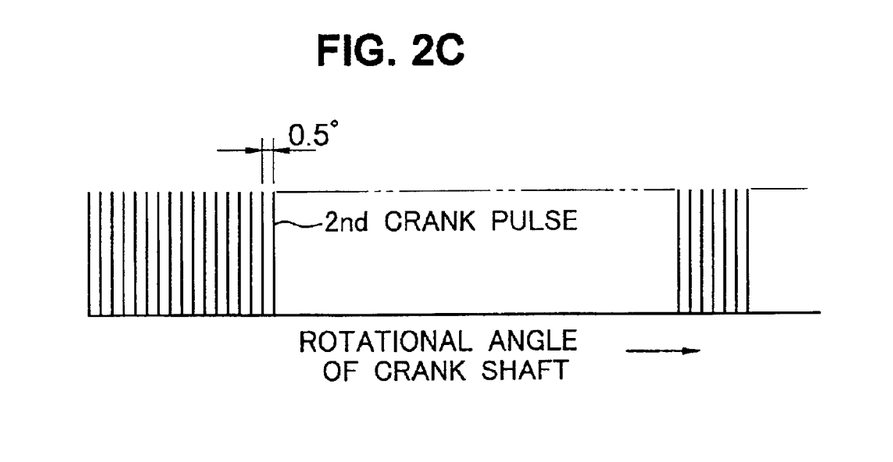

Referring first to FIGS. 1 and 2, an embodiment of a flow rate measuring apparatus according to the present invention is illustrated.

A flow rate measuring apparatus of the illustrated embodiment, as shown in FIG. 1, generally includes an encoder 1, a transmission timing control section 2, a transmission/receiving circuit 3, ultrasonic transducers 4a and 4b, a flow rate detection circuit 5, and an operation circuit 6.

The encoder 1 is mounted on a crank shaft 10a of an automobile engine 10 and functions to take up an angle signal from the crank shaft 10a and output it to a dividing/pulse generating circuit 21 of the transmission timing control section 2. The encoder 1, as shown in FIGS. 2A to 2C, is constructed so as to generate one first crank pulse at every rotation (period: $2\pi$ or angle: 360 degrees) of the crank shaft 10a and 720 second crank pulses at predetermined intervals or angular intervals of 0.5° during each rotation of the crank shaft 10a.

The transmission timing control section 2 is constructed so as to permit the ultrasonic transducers 4a and 4b to transmit an ultrasonic wave in accordance with a plurality of transmission modes different in transmission timing from each other. The transmission timing control section 2 includes a mode setting circuit 20, the dividing/pulse generating circuit 21 and a mode selection circuit 22. The transmission timing control section 2 outputs a synchronous pulse (trigger pulse) to the transmission/receiving circuit 3.

The mode setting circuit 20 manually sets any desired one of a plurality of predetermined transmission modes. More particularly, the mode setting circuit 20 sets any one mode of a first transmission mode for transmitting an ultrasonic wave at a predetermined timing in every one period of a flow waveform of exhaust gas discharged from the engine 10, a second transmission mode for transmitting an ultrasonic wave at a timing shifted by a predetermined time in every one period of the flow waveform and a third transmission mode for transmitting an ultrasonic wave at predetermined intervals.

The dividing/pulse generating circuit 21 generates an ultrasonic synchronous signal in accordance with a transmission mode set by the mode setting circuit 20 and an output signal of the encoder 1. The dividing/pulse generating circuit 21 outputs a trigger pulse through the mode selection circuit 22 to the transmission/receiving circuit 3.

Figures 3A, 3B:
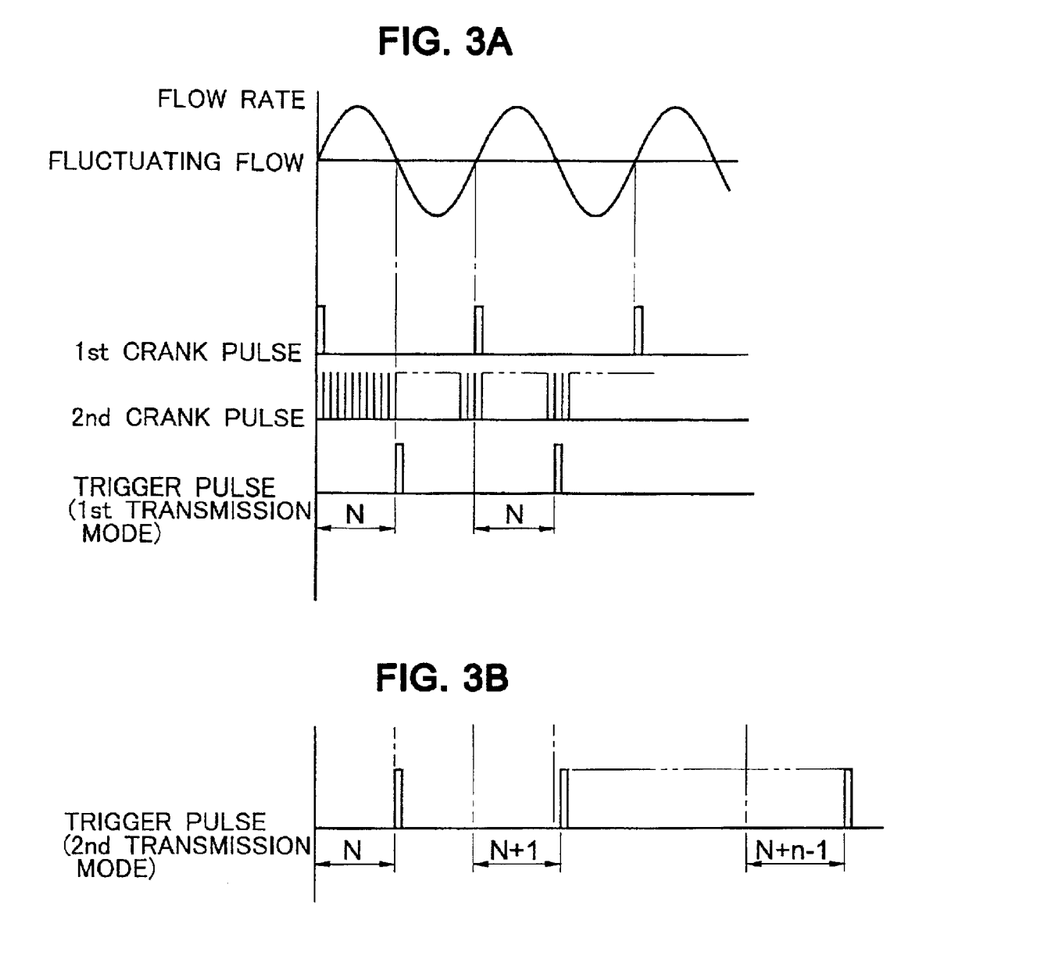
FIGS. 3A to 3C each are a diagrammatic view showing operation of a dividing/pulse generating circuit incorporated in the flow rate measuring apparatus of FIG. 1.
Figure 3C:
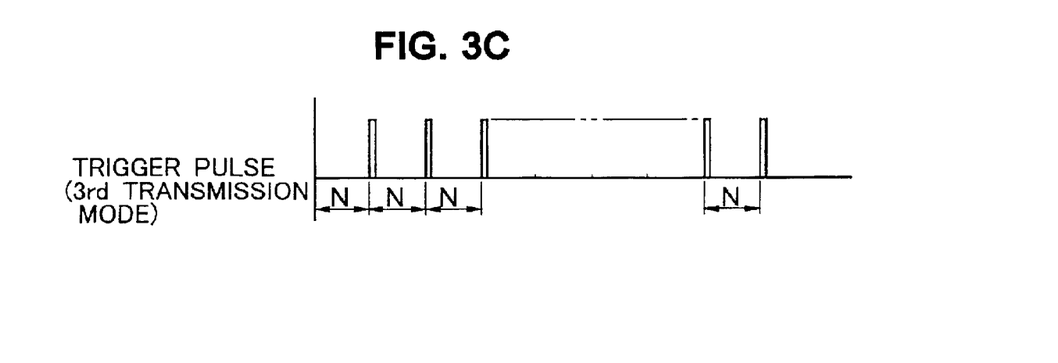

Now, operation of the dividing/pulse generating circuit 21 will be described with reference to FIGS. 3A to 3C, wherein FIG. 3A shows operation of the dividing/pulse generating circuit 21 when the first transmission mode is set, FIG. 3B shows the operation when the second transmission mode is set and FIG. 3C shows it when the third transmission mode is set.

When the first transmission mode is set by the mode setting circuit 20, the dividing/pulse generating circuit 21, as shown in FIG. 3A, generates a trigger pulse at an N-th second crank pulse on the basis of the time when a first crank pulse is generated. This results in the dividing/pulse generating circuit 21 generating a trigger pulse at any point of fluctuating flow of exhaust gas.

When the second transmission mode is set by the mode setting circuit 20, the dividing/pulse generating circuit 21, as shown in FIG. 3B, generates, on the basis of the time when a first crank pulse is generated, a trigger pulse at each of an N-th second crank pulse in a first period, an (N+1)-th second crank pulse in a second period, . . . , and an (N+n−1)-th second crank pulse in an n-th period. This results in the dividing/pulse generating circuit 21 generating a trigger pulse while varying or sweeping it in every period.

When the third transmission mode is set, the dividing/pulse generating circuit 21, as shown in FIG. 3C, generates a trigger pulse at every N-th second crank pulse or predetermined intervals.

The mode selection circuit 22 carries out change-over among the transmission modes based on a result of the calculation by the operation circuit 6. The mode selection circuit 22 resets a transmission timing of the first transmission mode based on a result of the calculation of the operation circuit 6, to thereby carry out change-over from the second transmission mode to the first transmission mode thus reset. Alternatively, the mode selection circuit 22, when a variation in flow rate of exhaust gas is reduced, carries out change-over from the first transmission mode or second transmission mode to the third transmission mode.

The transmission/receiving circuit 3 is configured so as to instruct each of the ultrasonic transducers 4a and 4b to transmit an ultrasonic wave or subject an output signal of each of the transducers 4a and 4b to predetermined processing to output it to the flow rate detection circuit 5.

The ultrasonic transducers 4a and 4b each transmit an ultrasonic wave to exhaust gas flowing in a direction indicated by an arrow in a pipe 10b in FIG. 1 and receive an ultrasonic wave which has propagated through the exhaust gas. The ultrasonic transducers 4a and 4b are arranged so as to be oblique with respect to the pipe 10b and mounted on an outer surface of the pipe 10b in a manner to be obliquely opposite to each other. The ultrasonic transducers 4a and 4b are located on a downstream side and an upstream side, respectively, to thereby mutually carry out transmission/receiving of an ultrasonic wave therebetween.

Figure 4:
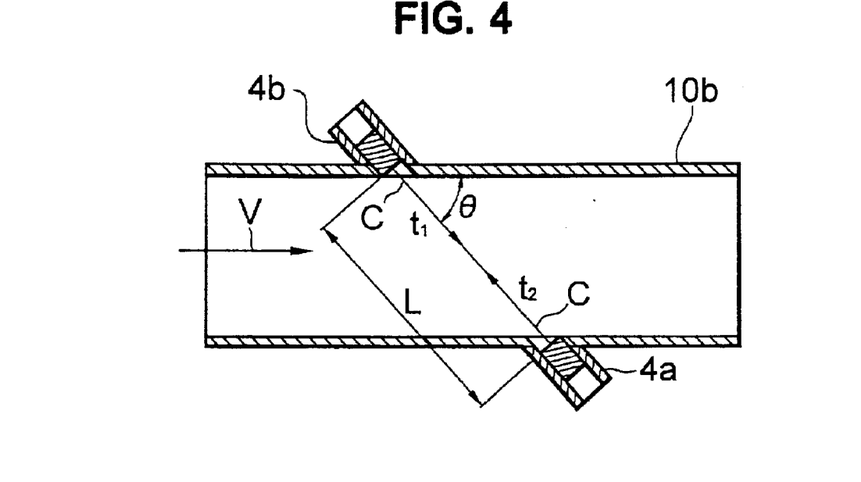
FIG. 4 is a sectional view showing measurement of a flow rate by the flow rate measuring apparatus of FIG. 1.

Now, measurement of a flow rate of exhaust gas by the flow rate measuring apparatus of the illustrated embodiment thus constructed will be described with reference to FIG. 4.

The flow rate detection circuit 5 calculates a flow rate of exhaust gas flowing in the pipe 10b based on an output signal of each of the ultrasonic transducers 4a and 4b. For this purpose, the flow rate detection circuit 5 is configured so as to calculate a flow rate of the exhaust gas using a so-called inverse propagation time difference method. The flow rate detection circuit 5 measures propagation time $t_1$ and $t_2$ of an ultrasonic wave according to the following expressions (1) and (2) in view of the Doppler effect:

$$t_1 = L/(C+V \cos \theta) \quad (1)$$

$$t_2 = L/(C-V \cos \theta) \quad (2)$$

wherein $t_1$ is propagation time taken for an ultrasonic wave which the ultrasonic transducer 4a transmitted to reach the ultrasonic transducer 4b, $t_2$ is propagation time taken for an ultrasonic wave which the ultrasonic transducer 4b transmitted to reach the ultrasonic transducer 4a, L is a linear distance between the ultrasonic transducers 4a and 4b, C is an acoustic velocity in exhaust gas, V is a flow velocity of exhaust gas, and θ is an inclined angle of the ultrasonic transducers 4a and 4b with respect to the outer surface of the pipe 10b.

The flow rate detection circuit 5 calculates the flow velocity V according to the following expression (3) on the basis of the above-described expressions (1) and (2) and outputs a result of the calculation to the operation circuit 6:

$$V=L(1/t_1-1/t_2)/2 \cos \theta \quad (3)$$

The flow rate detection circuit 5 uses a result of the calculation according to the expression (3) to calculate the flow rate in view of a sectional area of the pipe 10b, a corrected value of a known flow velocity distribution and the like.

The operation circuit 6 shown in FIG. 1 is configured so as to reproduce a flow waveform of exhaust gas on the basis of a result of the calculation by the flow rate detection circuit 5 to carry out analysis of the flow waveform, calculation of a zero point of an AC signal of the flow waveform or a peak point of upper and lower limits thereof or judgment as to whether a variation or fluctuation in flow rate of the exhaust gas is reduced. The operation circuit 6 outputs a result of the calculation to the mode selection circuit 22.

Figure 5:
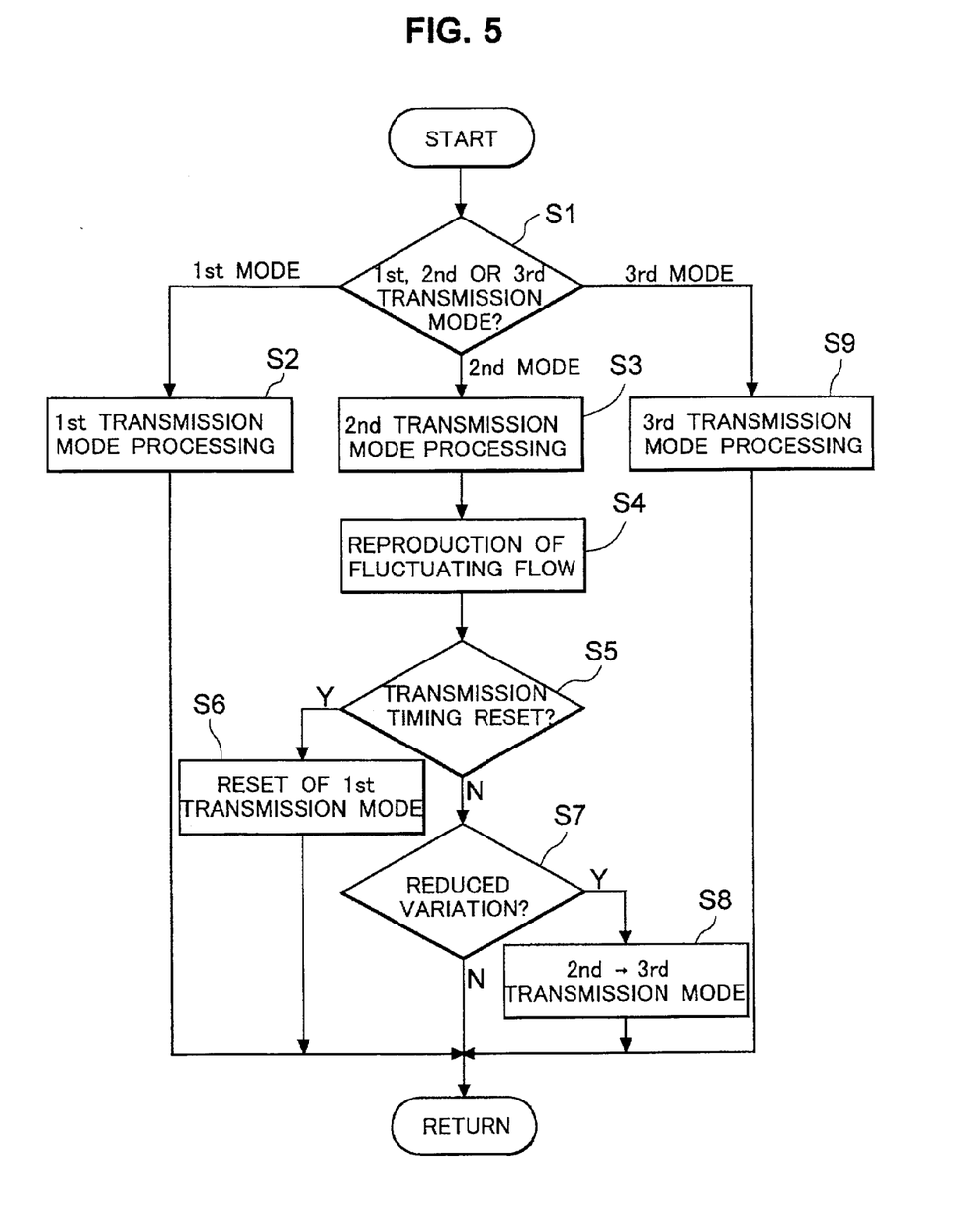
FIG. 5 is a flow chart showing operation of the flow rate measuring apparatus of FIG. 1.

Now, operation of the flow rate measuring apparatus of the illustrated embodiment will be described with reference to FIG. 5 which is a flow chart showing operation of the flow rate measuring apparatus.

In a step S1, the transmission timing control section 2 judges which of the first, second and third transmission modes is selected. When the mode setting circuit 20 sets the first transmission mode, the operation proceeds to a step S2. When the mode setting circuit 20 sets the second transmission mode, the operation proceeds to a step S3. Also, when the mode setting circuit 20 sets the third transmission mode, the operation proceeds to a step S9.

In the step S2, the transmission timing control section 2 executes processing in the first transmission mode. The dividing/pulse generating circuit 21, as shown in FIG. 3A, generates a trigger pulse at an N-th second crank pulse on the basis of the time when a first crank pulse is generated. This results in the flow rate detection circuit 5 measuring a flow rate of exhaust gas at the time when an N-th second crank pulse is generated.

In the step S3, the transmission timing control section 2 executes processing in the second transmission mode. The dividing/pulse generating circuit 21, as shown in FIG. 3B, generates a trigger pulse at an (N+n−1)-th second crank pulse in an n-th period. This results in the flow rate detection circuit 5 measuring a flow rate of exhaust gas at each of an N-th second crank pulse in a first period, an (N+1)-th second crank pulse in a second period, . . . , and an (N+n−1)-th second crank pulse in an n-th period.

In a step S4, the operation circuit 6 reproduces fluctuating flow of exhaust gas on the basis of a result of the calculation by the flow rate detection circuit 5. The operation circuit 6 joins exhaust gas flow rates at an N-th second crank pulse in a first period, (N+1)-th one in a second period, . . . , and (N+n−1)-th one in an n-th period together, to thereby reproduce a flow rate waveform.

In a step S5, the transmission timing control section 2 judges whether or not a transmission timing is reset. A flow rate waveform of exhaust gas is reproduced in the step S4, therefore, the transmission timing control section 2 detects a zero point of an AC signal of the flow rate waveform, a peak value of each of upper and lower limits thereof and the like, so that a transmission timing corresponding to each of such points may be reset. The transmission timing control section 2 judges whether or not a transmission timing is reset at any point such as the zero point, the peak value or the like. When the transmission timing is thus reset, the operation proceeds to a step S6; whereas when the transmission timing is not reset, the operation proceeds to a step S7.

In the step S6, the mode selection circuit 22 resets the first transmission mode. The mode setting circuit 20 resets an N value of the second crank pulse at any level, resulting in a timing at which the trigger pulse is generated being rendered variable.

In the step S7, the operation circuit 6 judges whether or not the exhaust gas flow rate calculated by the flow rate detection circuit 5 is below a predetermined level. When the exhaust gas flow rate is judged to be below the predetermined level, the operation proceeds to a step S8.

In the step S8, the mode selection circuit 22 carries out change-over from the second transmission mode to the third transmission mode. When the exhaust gas flow rate is below the predetermined level, an effect by pulsation is considered to be reduced, so that the mode selection circuit 22 carries out change-over from the second transmission mode to the third transmission mode which permits an exhaust gas flow rate to be measured while reducing a measuring interval.

In the step S9 briefly described above, the transmission timing control section 2 executes processing in the third transmission mode. The dividing/pulse generating circuit 21, as shown in FIG. 3C, generates a trigger pulse at every time when N second crank pulses are generated. Also, the dividing/pulse generating circuit 21 generates a trigger pulse at predetermined intervals irrespective of a rotational angle of the crank shaft 10a. This permits the flow rate detection circuit 5 to measure an exhaust gas flow rate while reducing a measuring interval.

The flow rate measuring apparatus of the illustrated embodiment constructed as described above exhibits a variety of advantages.

More specifically, the flow rate measuring apparatus of the illustrated embodiment is so configured that the plural or first to third transmission modes different in transmission timing from each other permit the ultrasonic transducers 4a and 4b to carry out transmission/receiving of an ultrasonic wave. Such construction permits a flow rate of exhaust gas to be measured at any desired timing.

Also, in the flow rate measuring apparatus of the illustrated embodiment, the mode selection circuit 22 carries out change-over of the transmission mode on the basis of a result of operation by the operation circuit 6. This results in the flow rate measuring apparatus measuring an optimum flow rate of fluctuating fluid.

Further, the illustrated embodiment is constructed so as to transmit an ultrasonic wave at a predetermined timing (first transmission mode) at every one period of a flow waveform of exhaust gas, so that measurement of a flow rate at any point in a fluctuating exhaust gas flow permits analysis of the fluctuating flow to be facilitated. Also, in the illustrated embodiment, an ultrasonic wave is transmitted at a timing shifted by a predetermined time at every one period of a flow waveform of exhaust gas or in the second transmission mode. Thus, joining of flow rate data at the respective timings to each other permits reproduction and analysis of the fluctuating flow to be facilitated. Further, in the illustrated embodiment, transmission of an ultrasonic wave is carried out at predetermined intervals (third transmission mode) irrespective of a rotational angle of the crank shaft 10a, so that an average flow rate may be measured with enhanced reliability.

Moreover, the illustrated embodiment is so constructed that the mode selection circuit 22 resets a transmission timing N in the first transmission mode on the basis of a result of the calculation by the operation circuit 6. Such construction permits the transmission timing N to be reset in view of pulsating flow reproduced by the operation circuit 6. More particularly, the transmission timing N may be reset at a timing corresponding to a zero point of the pulsating flow or a peak point of each of upper and lower limits thereof. This results in an average value of the fluctuating flow or a peak value thereof being accurately measured.

Furthermore, the illustrated embodiment is configured in the manner that when a variation in flow rate is reduced, the mode selection circuit 22 changes over the transmission mode from the second transmission mode to the third transmission mode. This results in an average flow rate being measured with increased reliability while reducing the measuring interval.

The illustrated embodiment has been described in connection with measurement of an exhaust gas flow rate. However, the present invention is not limited to measurement of gas. Thus, the present invention may be suitably applied to fluid rather than gas, such as liquid or the like.

Also, in the illustrated embodiment, change-over of the transmission mode is carried out manually. Alternatively, it may be automatically performed.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A flow rate measuring apparatus comprising:
   an ultrasonic transmission section for transmitting an ultrasonic wave to fluid flowing in a flow passage;
   an ultrasonic receiving section for receiving an ultrasonic wave which has propagated through the fluid;
   a transmission timing control section constructed so as to permit said ultrasonic transmission section to transmit an ultrasonic wave in accordance with a plurality of transmission 10 modes different in transmission timing from each other; and
   a flow rate operation section for calculating a flow rate of the fluid on the basis of an output signal of said ultrasonic receiving section.

2. A flow rate measuring apparatus as defined in claim 1, further comprising a transmission mode selection section for carrying out change-over among said transmission modes based on a result of the calculation by said flow rate operation section.

3. A flow rate measuring apparatus as defined in claim 1, wherein said transmission modes include:
   a first transmission mode which permits an ultrasonic wave to be transmitted at a predetermined timing for every period of a flow waveform of the fluid; and
   a second transmission mode which permits an ultrasonic wave to be transmitted at a timing shifted by a predetermined time for every period of the flow waveform of the fluid.

4. A flow rate measuring apparatus as defined in claim 2, wherein said transmission modes include:
   a first transmission mode which permits an ultrasonic wave to be transmitted at a predetermined timing for every period 30 of a flow waveform of the fluid; and
   a second transmission mode which permits an ultrasonic wave to be transmitted at a timing shifted by a predetermined time for every period of the flow waveform of the fluid.

5. A flow rate measuring apparatus as defined in claim 3, wherein said transmission modes further include a third transmission mode which permits an ultrasonic wave to be transmitted at predetermined intervals.

6. A flow rate measuring apparatus as defined in claim 4, wherein said transmission modes further include a third transmission mode which permits an ultrasonic wave to be transmitted at predetermined intervals.

7. A flow rate measuring apparatus as defined in claim 4, further comprising a transmission timing setting section for resetting a transmission timing of said first transmission mode in accordance with a result of the calculation by said flow rate operation section;
   said transmission mode selection section carrying out change-over from said second transmission mode to said first transmission mode thus reset.

8. A flow rate measuring apparatus as defined in claim 6, further comprising a transmission timing setting section for resetting a transmission timing of said first transmission mode in accordance with a result of the calculation by said flow rate operation section;
   said transmission mode selection section carrying out change-over from said second transmission mode to said first transmission mode thus reset.

9. A flow rate measuring apparatus as defined in claim 6, further comprising a flow rate variation judging section for judging whether or not a variation in flow rate is reduced based on a result of the calculation by said flow rate operation section;
   said transmission mode selection section carrying out change-over from said first or second transmission mode to said third transmission mode when a variation in flow rate is reduced.

10. A flow rate measuring apparatus as defined in claim 8, further comprising a flow rate variation judging section for judging whether or not a variation in flow rate is reduced based on a result of the calculation by said flow rate operation section;
    said transmission mode selection section carrying out change-over from said first or second transmission mode to said third transmission mode when a variation in flow rate is reduced.

11. A flow rate measuring apparatus as defined in claim 1, wherein said transmission modes include a transmission mode which permits an ultrasonic wave to be transmitted at a predetermined timing for every period of flow waveform of the fluid.

12. A flow rate measuring apparatus as defined in claim 1, wherein said transmission modes include a transmission mode which permits an ultrasonic wave to be transmitted at a timing shifted by a predetermined time for every period of flow waveform of the fluid.

* * * * *

UNITED STATES PATENT AND TRADEMARK OFFICE
CERTIFICATE OF CORRECTION

PATENT NO. : 6,782,326 B2
DATED : August 24, 2004
INVENTOR(S) : Masaki Takamoto et al.

It is certified that error appears in the above-identified patent and that said Letters Patent is hereby corrected as shown below:

Column 7,
Line 47, delete "10".

Column 8,
Line 5, delete "30".

Signed and Sealed this

Eighth Day of February, 2005

JON W. DUDAS
*Director of the United States Patent and Trademark Office*